United States Patent
Lynch et al.

(10) Patent No.: US 8,489,776 B2
(45) Date of Patent: Jul. 16, 2013

(54) APPARATUS AND METHOD FOR SYNCHRONIZING WIRELESS DEVICES

(75) Inventors: Michael A. Lynch, Shelburne, VT (US); Radoslaw R. Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 249 days.

(21) Appl. No.: 12/941,226

(22) Filed: Nov. 8, 2010

(65) Prior Publication Data

US 2012/0117272 A1    May 10, 2012

(51) Int. Cl.
*G06F 15/16* (2006.01)

(52) U.S. Cl.
USPC ........... 709/248; 370/252; 370/310; 370/350; 455/502; 713/400

(58) Field of Classification Search
USPC ........... 709/248; 370/252, 310, 350; 455/502; 713/400
See application file for complete search history.

(56) References Cited

U.S. PATENT DOCUMENTS

| | | | |
|---|---|---|---|
| 6,577,872 B1* | 6/2003 | Lundh et al. | 455/502 |
| 2005/0157658 A1* | 7/2005 | Ishii et al. | 370/252 |
| 2009/0228732 A1* | 9/2009 | Budde et al. | 713/400 |
| 2010/0142421 A1* | 6/2010 | Schlicht et al. | 370/310 |
| 2011/0255528 A1* | 10/2011 | Zakrzewski | 370/350 |

OTHER PUBLICATIONS

John Wiley & Andreas Willig, Protocols and Architectures for Wireless Sensor Networks—Chapter 8 "Time synchronization", John Wiley & Sons, Ltd., 2005 (pp. 201-229).

* cited by examiner

*Primary Examiner* — Moustafa M Meky
*Assistant Examiner* — Michael C Lai
(74) *Attorney, Agent, or Firm* — Edwards Wildman Palmer LLP; Scott D. Wofsy; George N. Chaclas (57) ABSTRACT

An apparatus for synchronizing devices includes a central access point node configured to utilize a low latency protocol to transmit a series of synchronization messages to the devices, transmit and receive data acquisition commands and responses from the devices using a high reliability protocol different from the low latency protocol, and calculate and apply relative clock offsets for each device based on the series of synchronization messages. The apparatus may also account for failure in delivery of a portion of the series of synchronization messages by recording timestamp data at the devices to send to the central access point prior to the central access point calculating the relative clock offsets.

15 Claims, 4 Drawing Sheets

APPARATUS AND METHOD FOR SYNCHRONIZING WIRELESS DEVICES

BACKGROUND OF THE DISCLOSURE

1. Field of the Disclosure

The subject disclosure relates to communication in sensing, monitoring and control systems, and more particularly to synchronizing wireless devices used on board aircraft.

2. Background of the Related Art

In recent years, the aerospace industry has been actively working on using wireless communication as a replacement for wired data connections in aircraft systems. Some benefits of wireless as opposed to traditionally wired sensor include weight and complexity reductions, simplified installation and maintenance, easier system reconfiguration as well as better diagnostic analysis. Additionally, new sensing technologies and aircraft subsystems are enabled by utilizing wireless technology, which eliminates additional design and installation costs and limits the additional wiring weight.

Mechanical and structural health monitoring and diagnostic systems particularly benefit from wireless technology. At present, wider use of such systems is hampered by the increased cost and complexity of the required wiring, which can often outweigh the potential gains. If no additional wiring were necessary, such systems might be more readily used, which would lead to significant improvements in maintenance costs and in aircraft reliability.

Most sensing and actuation systems require some degree of synchronicity between different elements. For example, a mechanical diagnostic system may collect vibration data from multiple sensors. For correct interpretation of multi-dimensional vibration data, it is necessary to make sure that the acquired signals correspond to the same intervals in time. The synchronization is typically achieved in one of two ways. The first approach is to devise a method to make sure that all sensors start their data acquisition at the same time. The second approach is to have all sensor nodes measure their local time according to well synchronized clocks.

The two approaches to synchronization are in fact equivalent. If it is possible to command several sensor nodes to perform a certain task starting at the same time, then the task may involve starting or resetting their clocks. If clock resets are done simultaneously, then the clocks will be closely synchronized for some time provided their rates do not differ too much. On the other hand, if the clocks are tightly synchronized, then the sensors may be commanded to perform the task of interest, such as to start data acquisition, at particular time values according to their clocks. In other words, the respective sensor's reading can be correlated in such way that the readings correspond to the same physical time instance.

Several techniques for synchronization of wireless devices are known and typically involve exchanges of time-stamped messages. Based on known send and receive times of sent messages, offsets and rate differences may be estimated between the clocks of those devices. For example, see "Protocols and architectures for wireless sensor networks" by Holger Karl and Andreas Willig, (published by John Wiley & Sons, Ltd. in the year 2005, hereinafter the Karl/Willig approach), which is incorporated herein by reference.

The Karl/Willig approach rests on the assumption that propagation and processing delays of the messages are symmetric and statistically constant in time. That is, it is assumed that any random delays in delivering a message from wireless node N1 to the wireless node N2 are distributed in the same way as message delivery delays from wireless node N2 to wireless node N1, and this statistical distribution is stationary in time. Furthermore, the accuracy of the resulting clock synchronization depends on the variability of message delivery delays. Generally, as the variance of message delivery delays gets larger, so does the synchronization error. Therefore, for synchronization to be accurate in the Karl/Willig approach, it is desirable to have as little variance in message delivery delays as possible.

In an effort to reduce development costs and to leverage the huge level of investment in consumer wireless technology, it is desirable to build wireless aircraft systems using commercial off-the-shelf (COTS) wireless components. COTS products typically do not allow access to lower level protocol functions but instead interface with the sensing device above a high-level network protocol. For example, wireless devices using the standard 802.11 protocol may be commercially available in form of modules allowing communication via TCP or UDP protocols.

Use of high level protocols is desirable because the software development costs are reduced and communication reliability is increased. The TCP protocol particularly represents years of development of reliable network communication and includes many built-in mechanisms to ensure dependable delivery of large quantities of data. In contrast, the much simpler UDP protocol does not include such reliability mechanisms, so the communication link may experience high and unpredictable message losses. For this reason, from the software development point of view, the use of TCP may be more attractive than UDP, because TCP reduces or eliminates the need to add customized reliability mechanisms.

SUMMARY OF THE INVENTION

There are problems associated with high level communication protocols when synchronizing is required because, there is uncertainty about the exact time of delivery. The latency of a particular message cannot be fully predicted due to high level protocols such as TCP using multiple software layers as well as complicated acknowledgement, retransmission, and packet scheduling algorithms. The unpredictable latency creates a difficulty with performing synchronization of end devices using these high level protocols.

The subject disclosure has recognized and addressed the need to effectively synchronize sensors and other system elements that communicate wirelessly using high level commercial protocols. In one method, commercially available high level protocols, such as TCP, are used for reliable wireless transmission of sensor data. However for synchronization purposes, the method switches operation to a less complicated, potentially less reliable, but simpler protocol with limited and/or more consistent latency, such as UDP. In order to accommodate the higher message losses associated with the simpler protocol, a number of approaches are developed to still efficiently complete accurate synchronization calculations. Hence, the method allows utilizing the high reliability of complex packet-based commercial-off-the-shelf protocols for data transfer while still allowing for tight synchronization. As a result, the cost and development effort of the wireless sensing systems is desirably lower.

In one embodiment, the subject technology is directed to a method for synchronizing a plurality of wireless devices including the steps of sending a set of multiple reference messages from an access point to each of the plurality of devices, recording, at each device, a timestamp corresponding to each of the reference messages that is received, sending from each of the wireless devices a response to a request for the timestamps corresponding to the reference messages, and determining relative clock offsets between each of the wireless devices using the timestamps. The devices may be sensors, control systems, monitoring systems and the like.

In another embodiment, the subject technology is a method for synchronizing devices from a central access point node, the method including the steps of utilizing a low latency protocol between the central access point node and the devices to transmit a series of reference broadcasts, calculating and applying relative clock offsets for each device based on the series of reference broadcasts, and transmitting and receiving data acquisition commands and responses between the central access point node and the devices using a high reliability protocol different from the low latency protocol.

The devices may be wireless sensors. The low latency protocol may be UDP and the high reliability protocol may be TCP. The series of reference broadcasts can include timestamp pairs sent to first and second devices. The method may also include accounting for failure in delivery of a portion of the series of reference broadcasts by utilizing each broadcast received at the first and second device nodes, and calculating at the central access point node an intermediate quantity for each device based on timestamps sent from each device.

The method may calculate the clock offset using a subset of the series of reference broadcasts. For example, the subset can be broadcasts with minimal propagation and processing delays. The subset could be a simple percentage such as 50% of the series of reference broadcasts, only messages with delays below a predetermined threshold, a certain amount such as a statistically significant sample size, and the like. The method also can calculate a clock drift for at least one of the devices based on the series of reference broadcasts.

Another embodiment is a method for synchronizing devices from a central access point node including the steps of transmitting a series of reference broadcasts between the central access point node and the devices, accounting for failure in delivery of a portion of the series of reference broadcasts, collecting timestamp data based on the series of reference broadcasts, and calculating and applying relative clock offsets for each device based on the timestamp data of the series of reference broadcasts. The devices can be a first and second device in which the timestamp data from the first device is decoupled from the timestamp data of the second device.

The subject technology is also directed to an apparatus for synchronizing devices including a central access point node configured to utilize a low latency protocol to transmit a series of reference broadcasts to the devices, transmit and receive data acquisition commands and responses from the devices using a high reliability protocol different from the low latency protocol, and calculate and apply relative clock offsets for each device based on the series of reference broadcasts. The apparatus may also account for failure in delivery of a portion of the series of reference broadcasts by recording timestamp data at the devices to send to the central access point prior to the central access point calculating the relative clock offsets.

It should be appreciated that the present technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The present disclosure overcomes many of the prior art problems associated with synchronizing wireless systems. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference letters and numerals identify similar structural elements.

Figure 1:
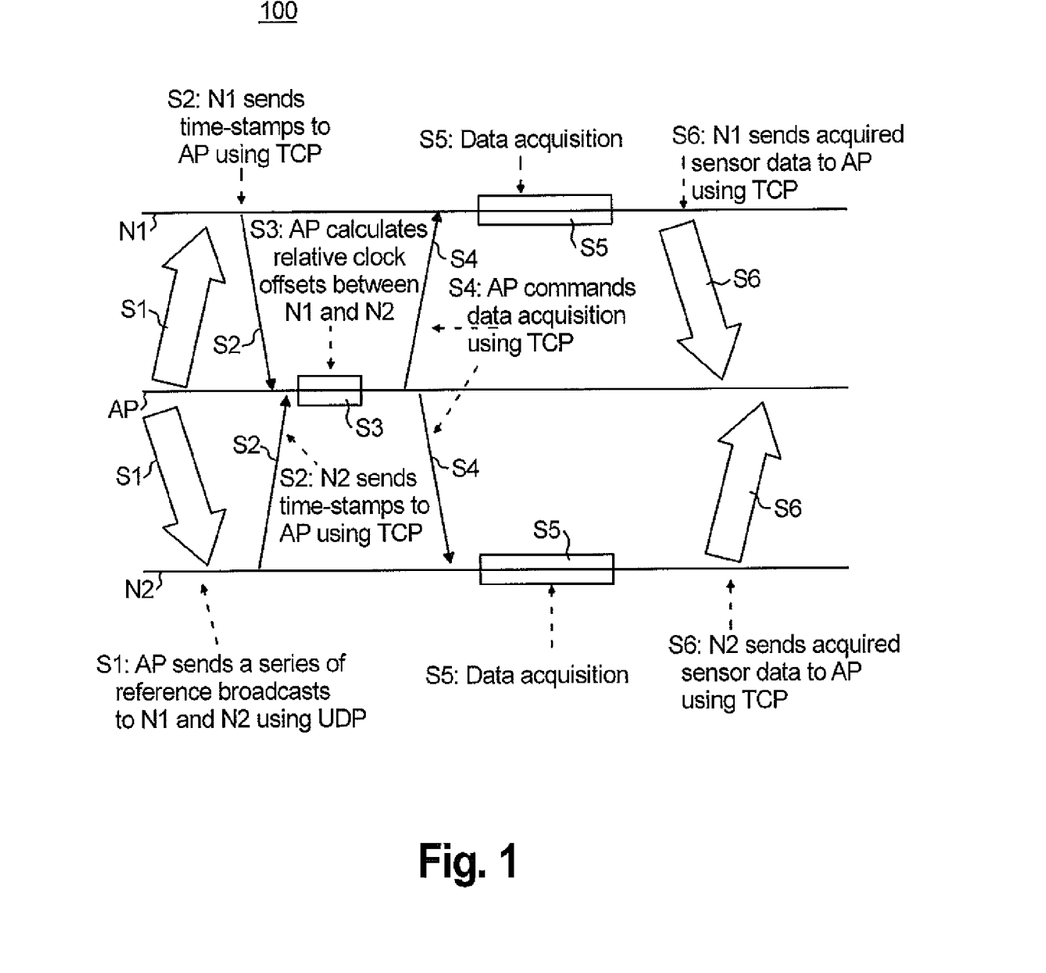
FIG. 1 is a flowchart illustrating a synchronization method for wireless sensors in accordance with the subject technology.

Now referring to FIG. 1, a flowchart 100 illustrating a synchronization method for wireless sensors in accordance with the subject technology is shown. The synchronization method 100 is for a system having sensors that use the highly reliable TCP protocol for most message exchanges including data acquisition commands from a central access point node AP and transmission of the acquired sensor data to the central access point node AP.

For exchanges of synchronization messages that require lower latency, the method 100 switches to a simpler albeit less reliable protocol such as UDP. Even though not all UDP messages may reach their destination, the messages that are completed have lower and less random delivery delays than the more reliable TCP. The synchronization method of FIG. 1 may utilize, in whole or in part, relative synchronization of sensors via reference broadcast as disclosed in U.S. patent application Ser. No. 12/799,087, filed on Apr. 16, 2010 and entitled SYNCHRONIZING WIRELESS DEVICES, which is incorporated by reference herein (hereinafter the '087 application).

Still referring to FIG. 1, the method 100 illustrates message exchange sequences between the central access point node AP, a first wireless sensor node N1, and a second wireless sensor node N2. At step S1, an initial series of reference broadcast messages are sent by UDP from the central access point node AP to the wireless sensor nodes N1, N2. The arrival times of the reference broadcast messages at the sensor nodes N1, N2 are used to calculate relative offsets between the clocks of nodes N1, N2. As would be appreciated by those of ordinary skill in the art based upon review of the subject technology, even though FIG. 1 illustrates two sensor nodes N1, N2 communicating with the central access point node AP, the method 100 is equally applicable to a plurality of any number of sensors.

By using UDP for this initial series of broadcasts, it is possible to reduce the random spread of message delays and thus to improve synchronization accuracy. Because UDP does not include any built-in reliability mechanisms, some of the reference broadcast messages may be lost. Some complications may arise when different messages are lost between the central access point node AP and sensor node N1 and between the central access point node AP and sensor node N2. As a consequence, the timestamp information from nodes N1, N2 may correspond to different sets of reference broadcasts messages. The method 100 resolves the difficulty associated with lost messages as discussed hereinbelow.

Note that for clarity, FIG. 1 does not depict all messages exchanged between the nodes AP, N1, N2. For example, requests for timestamp data or for the acquired sensor data may be sent from the central access point node AP to the sensor nodes N1, N2. Alternatively, the sensor nodes N1, N2 may be sending the data to the central access point node AP based on a schedule, which may be predetermined beforehand, included as additional payload in reference broadcasts, or in data acquisition commands. Similarly, the timestamp data from the sensor nodes N1, N2 may be bundled together with the acquired sensor data after acquisition is completed. The central access point node AP may perform post-hoc calculation of the relative clock offsets.

As mentioned above, step S1 utilizes a low-latency, relatively low-reliability protocol for the initial reference series of timestamp messages. Since a larger number of the initial messages may not be delivered, the decrease in accuracy of calculating the relative clock offset between the sensor nodes N1, N2 must be overcome. For example, if the central access point node AP sends a number M of reference broadcast messages, let $t_1^{(i)}$ and $t_2^{(i)}$ be the receive timestamps at sensor nodes N1, N2, according to the corresponding local clocks. If all M reference broadcasts were received by the sensor nodes N1, N2, then a set of clock offset estimates between the sensor nodes N1, N2 could be defined as $$O^{(i)}_{12} = t_1^{(i)} - t_2^{(i)}$$

where $O^{(i)}_{12}$ is the set and i=1 . . . M. Then, as described in the '087 application, the set of offset estimates $O^{(i)}_{12}$ may be used to calculate the overall clock offset estimate. This may be done through arithmetic mean, median, their trimmed versions (with outliers rejected), or other estimation methods now known or later developed.

Alternatively, if some number of reference messages are lost at the sensor nodes N1, N2, then the number of individual offset estimates $O^{(i)}_{12}$ may become small. For example, if 10% of messages fail to arrive at the sensor nodes N1, N2, then the number of available estimates in the set $O^{(i)}_{12}$ is reduced by up to 20%. In a more severe case, a loss of 40% of messages at each sensor node N1, N2 may result in up to 80% of clock offset estimates in set $O^{(i)}_{12}$ being lost, or equivalently only 20% of those estimates are available. In such a case, in order to achieve the desired accuracy of clock offset estimation, it might be necessary to increase the number of reference broadcasts by five times. Further, from the point of view of energy consumption, it is desirable to minimize the number of reference broadcasts sent by the central access point node AP.

The problem of lost messages is alleviated in the method 100 of calculating the overall clock offset estimate. At step S2, the sensor nodes N1, N2 send timestamps to the central access point node AP. As noted above, if $t_0^{(i)}$, where i=1, . . . M denotes the instances when reference broadcasts were sent from the central access point node AP, measured locally according to the central access point node clock, the timestamp difference between the central access point node AP and both sensor nodes N1, N2 is represented as follows $$O^{(i)}_{20} = t_2^{(i)} - t_0^{(i)}$$

$$O^{(i)}_{10} = t_1^{(i)} - t_0^{(i)}$$

In the perfect case when all messages were delivered instantaneously (i.e., with zero propagation and processing delays), then the quantities $O^{(i)}_{20}$ and $O^{(i)}_{10}$ could be treated as instantaneous clock offsets between the central access point node AP and the sensor nodes N1, N2. Because of the nonzero propagation and processing delays, the numbers $O^{(i)}_{20}$ and $O^{(i)}_{10}$ do not allow any accurate synchronization between the central point access node AP and sensor node N1, or between the central point access node AP and sensor node N2. The mean values of the timestamp differences are defined by $$O^{mean}_{20} = \text{mean}(O^{(i)}_{20})$$

$$O^{mean}_{10} = \text{mean}(O^{(i)}_{10})$$

In the case when all reference broadcasts are received by both sensors, the following applies $$O^{mean}_{12} = O^{mean}_{10} - O^{mean}_{20} = \text{mean}(O^{(i)}_{12})$$

In short, the intermediate calculation of the means $O^{(i)}_{20}$ and $O^{(i)}_{10}$ in the method 100 may not be necessary when every message is delivered. However, use of the intermediate quantities $O^{(i)}_{20}$ and $O^{(i)}_{10}$ is advantageous when some of the reference broadcast messages of step S1 are not received by the sensor nodes N1, N2.

At step S3, the central access point node AP calculates the relative clock offsets between the sensor nodes N1, N2 using the intermediate quantities $O^{(i)}_{20}$ and $O^{(i)}_{10}$. For example, if 25% of the broadcast messages are lost by sensor nodes N1, N2, up to 50% of timestamp pairs $t_1^{(i)}$, $t_2^{(i)}$ may be not not available for synchronization purposes. Hence, to accomplish the same desired synchronization accuracy, the number of reference broadcast needs to be doubled.

On the other hand, for calculation of the intermediate estimate $O^{mean}_{10}$, the number of timestamp pairs $t_1^{(i)}$, $t_0^{(i)}$ is 75% of the non-loss case (e.g., only a 25% shortfall). Similarly, the intermediate estimate $O^{mean}_{20}$ may be calculated using 75% of all timestamp pairs $t_2^{(i)}$, $t_0^{(i)}$. As a result, the overall clock offset estimate $O^{mean}_{12} = O^{mean}_{10} - O^{mean}_{20}$ calculated from the intermediate quantities $O^{(i)}_{20}$ and $O^{(i)}_{10}$ is more accurate. If desired, to achieve the same synchronization accuracy, the number of reference broadcast needs to only be increased by one third.

Once the desired overall clock offsets are determined from the overall clock offset estimates $O^{mean}_{12}$, the method 100 proceeds. At step S4, the method 100 is ready for data acquisition, so the central access point node AP commands the sensor nodes to acquire data using TCP. At step S5, the sensor nodes N1, N2 collect the relevant data. Upon completion of the data acquisition period, the sensor nodes N1, N2 send the acquired data to the central access point node AP using TCP as shown in step S6.

Figure 2:
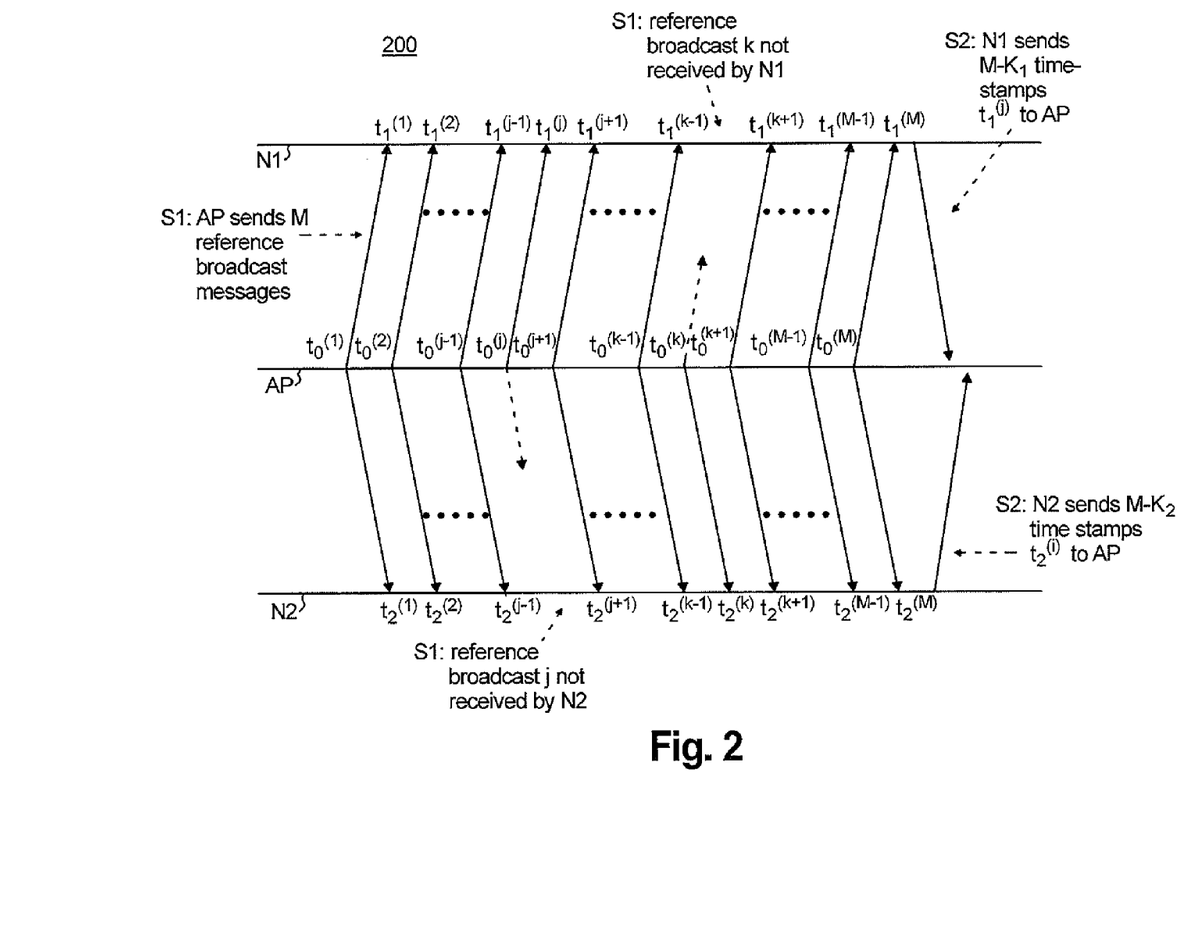
FIG. 2 is an exemplary series of reference broadcasts between the central access point AP and wireless sensor nodes N1, N2 in accordance with the subject technology.

Referring now to FIG. 2, an exemplary series of reference broadcasts between the central access point AP and wireless sensor nodes N1, N2 is referred to generally by the reference numeral 200 and illustrates a possible exemplary data with which the method 100 of FIG. 1 may be utilized. With respect to the reference broadcasts sent to the sensor nodes N1, N2, the reference message j is not received by the sensor node N2, but the reference message j is received by the sensor node N1. Consequently, the timestamp pair $t_1^{(j)}$, $t_0^{(j)}$ may still contribute to the intermediate calculation of $O^{mean}_{10}$ even though there is no timestamp $t_2^{(j)}$ to contribute to the intermediate calculation of $O^{mean}_{20}$. Similarly, the reference message k is lost at the sensor node N1, but the reference message k is received by the sensor node N2. In the subject method 100, the timestamp pair $t_2^{(k)}$, $t_0^{(k)}$ is used in calculation of $O^{mean}_{20}$ even though the missing timestamp $t_1^{(k)}$ cannot be used in calculation of $O^{mean}_{10}$. Overall, if $K_1$ and $K_2$ messages are lost at the sensor nodes N1, N2, respectively, then $O^{mean}_{10}$ may be calculated from $N-K_1$ timestamp pairs $(t_1^{(i)}, t_0^{(i)})$, and $O^{mean}_{20}$ may be calculated from $N-K_2$ timestamp pairs $(t_2^{(i)}, t_0^{(i)})$. In prior art approaches, in a worst case scenario of different message being lost, only $N-K_1-K_2$ timestamp pairs $(t_2^{(i)}, t_1^{(i)})$ are used to calculate $O^{mean}_{12}$.

In another embodiment, the method 100 performs a clock offset calculation based on the broadcast messages for which the propagation and processing delay is the shortest. Typically, the shorter the delay, the more accurate the resulting calculation. The messages for which the timestamp differences $O^{(i)}_{10}$ and $O^{(i)}_{20}$ are minimal are denoted as follows $$O^{min}_{20} = \min(O^{(i)}_{20})$$

$$O^{min}_{10} = \min(O^{(i)}_{10})$$

where the minima are taken over the reference broadcasts received by the sensor nodes N2, N1, respectively. The following clock offset estimate may be calculated as $$O^{min}_{12} = O^{min}_{10} - O^{min}_{20}$$

Note that depending on the actual statistical distribution of timestamp differences $O^{(i)}_{10}$ and $O^{(i)}_{20}$, a plurality of methods may be used for estimating the overall clock offset between the sensor nodes N1, N2. For example, a median approach may be used to estimate $O_{10}$ and $O_{20}$ to minimize the influence of outliers. Another possibility may be to use a trimmed mean approach, or a trimmed median approach, when a fixed number of largest values of $O^{(i)}_{10}$ and $O^{(i)}_{20}$ would be excluded from calculations. As a result, the estimation of the clock offset $O_{10}$ between the central access point node AP and the sensor node N1 is decoupled from the estimation of the clock offset $O_{20}$ between the central access point node AP and the sensor node N2, and then the resulting estimates are combined into the final clock offset $O_{12}$ between the sensor nodes N1, N2. By doing so, timestamp information associated with a particular reference broadcast is utilized as long as at least one sensor received that message.

Figure 3:
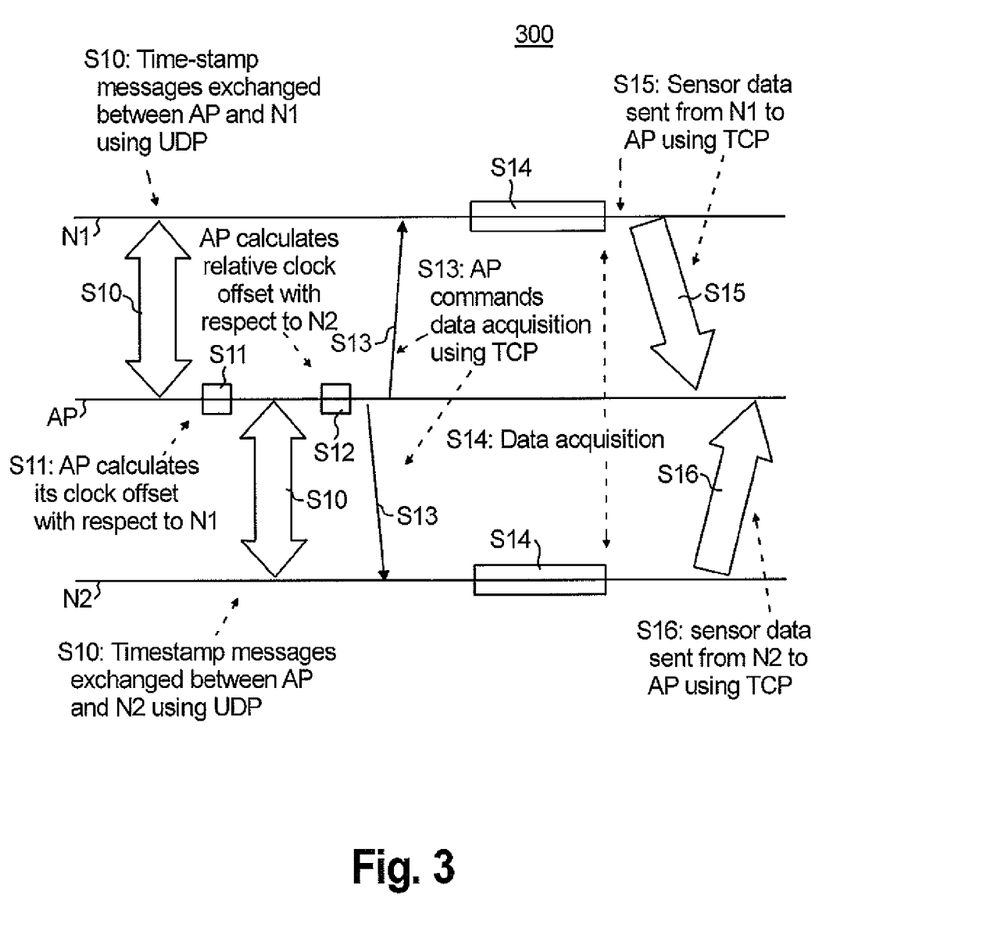
FIG. 3 is a flowchart illustrating another synchronization method for wireless sensors in accordance with the subject technology.

Now referring to FIG. 3, a flowchart 300 illustrating another synchronization method for wireless sensors in accordance with the subject technology is shown. As will be appreciated by those of ordinary skill in the pertinent art, the method 300 utilizes similar principles and hardware structure to the method 100 described above. Accordingly, like reference numerals and letters are used to indicate like elements. The primary difference of the method 300 in comparison to the method 100 is the pair-wise synchronization between the central point access node AP and the sensor nodes N1, N2 based on quadruple timestamp exchanges. In one embodiment, the method 300 decouples the calculations involving messages from the central access point node AP to the sensor nodes N1, N2 as well as messages from the sensor nodes N1, N2 to the central access point node AP. By doing so, both the accuracy and the duration of the method 300 are improved.

At initial step S10 of the method 300, the central access point node AP and the sensor nodes N1, N2 exchange timestamps using the simple UDP protocol to reduce latency. It is noted that the timestamp exchanges may occur at different times as shown in FIG. 3. As mentioned above, a potential drawback of using the UDP protocol is that some of the timestamp messages may be lost. On the other hand, the timestamp messages that do arrive may be delivered faster and with more certainty, due to fewer software layers involved in handling the messages, which allows for more accurate synchronization. The rest of the communication, including the data acquisition commands from the central access point node AP to the sensor nodes N1, N2, may be performed via the more complex TCP protocol.

At step S11, the central access point node AP calculates the relative clock offset for the sensor node N1 based on the timestamp exchange. At step S12, the central access point node AP calculates the relative clock offset for the sensor node N2. Once the desired overall clock offsets are determined, the method 300 proceeds.

At step S13, the method 300 is ready for data acquisition, so the central access point node AP commands the sensor nodes N1, N2 to acquire data using TCP. At step S14, the sensor nodes N1, N2 collect data. Upon completion of the data acquisition period, the sensor nodes N1, N2 send the acquired data to the central access point node AP using TCP as shown in steps S15, S16, respectively.

Note that the depiction of method 300 in FIG. 3 is only meant to illustrate graphically one possible rendering of the subject technology, and does not include some of the messages that need to be exchanged for clarity. For example, the transfer of sensor data to the central point access node AP may involve data requests or acknowledgements from the central point access node AP to the sensor nodes N1, N2.

In addition, the timing and sequence of events may differ from that shown in the FIG. 3. For example, the clock offsets between the central access point node AP and both sensor nodes N1, N2 may be calculated only after all timestamp exchanges are finished. Similarly, the two series of timestamp exchanges of step S10 between the central point access node AP and the sensor node N1 and between the central point access node AP and the sensor node N2 may be interleaved instead of occurring one after the other.

Figure 4:
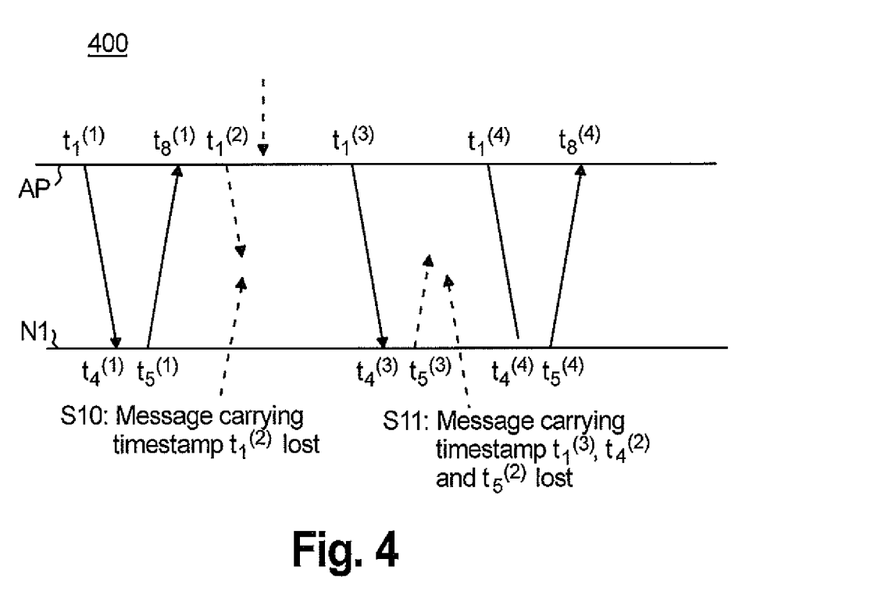
FIG. 4 is an exemplary series of synchronization messages between the central access point AP and wireless sensor node N1 in accordance with the method of FIG. 3.

Referring now to FIG. 4, an exemplary series of synchronization messages 400 between the central access point AP and wireless sensor node N1 is referred to generally by the reference numeral 400 and illustrates a possible example of a modification of the clock offset calculations in the quadruple timestamp approach of method 300. In the method 300 of FIG. 3, losses of timestamp messages are comparatively more likely than in the method 100 of FIG. 1 because the losses may occur on the way from the central access point node AP to the sensors N1, N2 as well as on the return route. For simplicity, only messages between the central point access node AP and the sensor node N1 are shown. In FIG. 4, the timestamps sent from the central access point node AP are denoted as $t_1^{(i)}$, and the timestamps received at the sensor node N1 are denoted as $t_4^{(i)}$. The timestamps sent from the sensor node N1 are denoted as $t_5^{(i)}$, and the timestamps received at the central point access node AP are denoted as $t_8^{(i)}$.

As can be seen, at step S10 of FIG. 4, a message carrying timestamp $t_1^{(2)}$ sent from the central access point node AP to the sensor node N1 was lost. Similarly, at step S11 of FIG. 4, a message carrying timestamps $t_1^{(3)}$, $t_4^{(2)}$, $t_5^{(2)}$ sent from the sensor node N1 to the central access point node AP was also lost.

The method 300 of FIG. 3 may calculate individual clock offset estimates for each message pair according to the formula $$O_{10}^{(i)} = (t_8^{(i)} - t_5^{(i)} - t_4^{(i)} + t_1^{(i)})/2$$

The collection of estimates $O_{10}^{(i)}$ is then used to calculate the overall clock offset between the central access point node AP and the sensor node N1. Several methods are known for subsequently determining the clock offset based on this data and, thus, any estimation techniques now known or later developed may be utilized.

In the circumstances where the timestamp message delivery experiences message losses, then the set of available individual estimates $O_{10}^{(i)}$ may become dramatically small. For example, in FIG. 4, the central access point node AP initiates four timestamp exchanges using messages carrying timestamps $t_1^{(1-4)}$ but only two time stamp responses carrying timestamps $t_5^{(1)}$, $t_5^{(4)}$ are returned by the sensor node N1 (the second response $t_5^{(3)}$ fails). Because of the loss of two messages carrying timestamps $t_1^{(2)}$, $t_5^{(3)}$ (one from the central access point node AP to the sensor node N1 at step S10, and one response from the sensor node N1 to the central access point node AP at step S11, respectively), only two individual clocks offset estimates $O_{10}^{(1)}$ and $O_{10}^{(4)}$ may be calculated. As can be seen, even moderate message losses may significantly impair the synchronization process 300, necessitating a significant increase of the number of messages to be exchanged to achieve the required synchronization accuracy.

A drawback of simply increasing the number of timestamp messages sent is the increased time of the overall synchronization operation. For example, after a message from the central access point node AP to the sensor node N1 is lost, the central access point node AP waits for a response from the sensor node N1. Thus, the next message to the sensor node N1 is sent only after the central access point node AP times out when it becomes apparent that no response will be coming. This unnecessary waiting time translates into unnecessary energy expenditure while both nodes AP, N1 are in an active state.

The method 300 overcomes the lost messages problem by observing that in the formula to calculate $O_{10}^{(i)}$, the two timestamp differences $t_8^{(i)}-t_5^{(i)}$ and $t_4^{(i)}-t_1^{(i)}$ are independent, because two timestamp differences $t_8^{(i)}-t_5^{(i)}$ and $t_4^{(i)}-t_1^{(i)}$ correspond to two distinct messages: the difference $t_4^{(i)}-t_1^{(i)}$ corresponds to the message from the central access point AP to the sensor node N1, and the difference $t_8^{(i)}-t_5^{(i)}$ corresponds to the message from the sensor node N1 to the central access point AP. Because the associated propagation and processing delays do not depend on each other, consecutive messages exchanged between the two wireless devices are not required.

Figure 5:
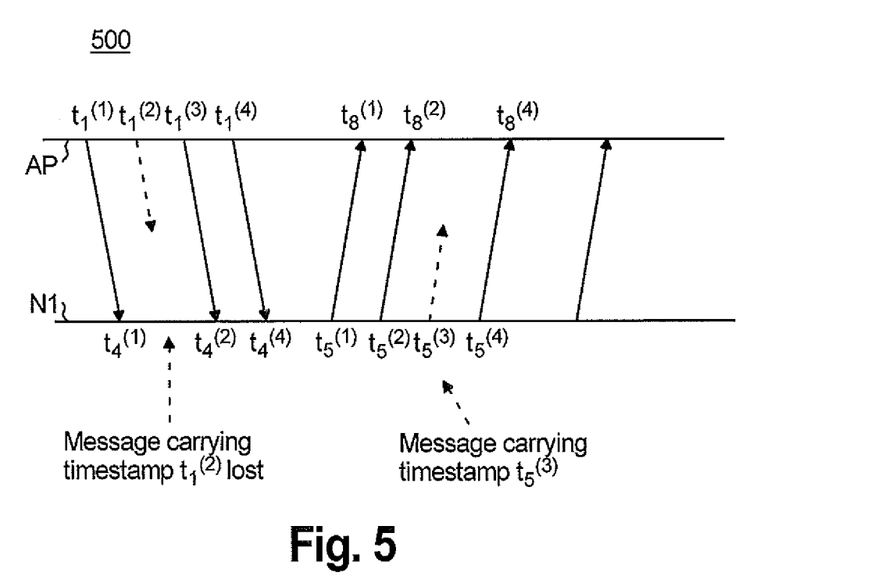
FIG. 5 is another exemplary series of synchronization messages between the central access point AP and wireless sensor node N1 in accordance with the method of FIG. 3.

Referring now to FIG. 5, another exemplary series of synchronization messages 500 between the central access point AP and wireless sensor node N1 in accordance with the method of FIG. 3 is shown. The scheme utilized in FIG. 5 takes advantage of the sensor node N1 not needing to respond to each and every message carrying timestamps $t_1^{(1-4)}$ sent by the central access point AP. Instead, the sensor node N1 collects the timestamp data $t_1^{(1,3,4)}$ and $t_4^{(1,3,4)}$ associated with a sequence of received messages from the central access point AP, and then responds with a sequence of response messages carrying timestamps $t_5^{(1-4)}$.

In this example, two messages carrying timestamps $t_1^{(2)}$, $t_5^{(3)}$ have been lost out of eight messages sent, which is the same message loss rate as in the example of FIG. 4. However, there are six usable timestamp pairs, which may be used to calculate the clock offset estimate between the central access point node AP and the sensor node N1. More generally, assume that out of M messages sent from the central access point node AP to the sensor node N1, the number $K_1$ of messages were lost, resulting in $M-K_1$ usable timestamp pairs $t_1^{(i)}$, $t_4^{(i)}$. Similarly, assume that out of M response messages sent from the sensor node N1 to the central access point node AP, the number $K_2$ messages were lost, resulting in $M-K_2$ usable timestamp pairs $t_8^{(i)}$, $t_5^{(i)}$. The corresponding timestamp differences are defined as follows:

$$O_f^{(i)}=t_4^{(i)}-t_1^{(i)}$$

$$O_r^{(i)}=t_8^{(i)}-t_5^{(i)}$$

where the subscript "f" is chosen to denote the forward message route from the central access point node AP to the sensor node N1 and the subscript "r" corresponds to the response route from sensor node N1 to the central access point node AP.

The mean values of the differences $O_f^{(i)}$, $O_r^{(i)}$ are defined as follows:

$$O^{mean}_f=\text{mean}(O^{(i)}_f)$$

$$O^{mean}_r=\text{mean}(O^{(i)}_r)$$

where the averages are taken over the respective collections of the available timestamp differences. The overall clock offset estimate may be calculated as $$O^{mean}_{10}=(O^{mean}_r-O^{mean}_f)/2$$

Note that when there are no messages losses, this overall clock offset estimate is equivalent to $$O^{mean}_{10}=\text{mean}(t_8^{(i)}-t_5^{(i)}-t_4^{(i)}+t_1^{(i)})/2$$

The modified overall clock offset estimate formula becomes clearly advantageous when there may be message losses in both directions. By decoupling the timestamp data for messages from the central point access node AP to the sensor node N1 from the timestamp data from the sensor node N1 to the central access point node AP, the data is used more efficiently, and fewer messages need to be sent. Also, note that the waiting period following message losses is greatly reduced. Because either of the wireless nodes sends a sequence of messages without waiting for responses, the central access point node AP avoids unnecessary waiting, which may allow a significant reduction in energy use.

Another improvement in the clock offset calculation results from the observation that the best accuracy of calculation is given by those messages for which the propagation and processing delay is the shortest, i.e., the messages for which the timestamp differences $O^{(i)}_f$ and $O^{(i)}_r$ are smallest. That is, let $$O^{min}_f=\min(O^{(i)}_f)$$

$$O^{min}_r=\min(O^{(i)}_r)$$

where the minima are taken over the timestamp messages received by the sensor node N1 and the central point access node AP, respectively. Then, the following clock offset estimate may be calculated as $$O^{min}_{10}=(O^{min}_r-O^{min}_f)/2$$

Again, note that depending on the actual statistical distribution of the quantities $O^{(i)}_f$ and $O^{(i)}_r$, various estimation methods may be used for clock offset calculation. This may involve median, trimmed median, or other estimators now known or later developed.

Referring again to FIG. 5, note that the set of timestamp pairs $t1^{(i)}$, $t_4^{(i)}$ corresponding to the first sequence of messages may be transmitted from the sensor node N1 to the central access point node AP at the end of the whole process, in a separate message or messages using the high-reliability TCP protocol. The exact time instant when this information reaches the central access point node AP is not critical, as long is the transmission occurs soon after the last timestamp message from sensor node N1 reaches the central access point node AP.

Alternatively, the set of timestamp pairs $t1^{(i)}$, $t_4^{(i)}$ may be sent from the sensor node N1 to the central access point node AP between two sequences of messages. Yet another possibility is to include the timestamp data as additional payload in the timestamp messages from sensor node N1 to the central access point node AP, possibly repeated in consecutive messages to account for the possible message losses. In most applications, once the timestamps $t1^{(i)}$, $t_4^{(i)}$ are recorded by the sensor node N1, the information only needs to be sent to the central access point node AP in time for the central access point node AP to calculate the clock offset.

Typically, even when the clock rates differ slightly, if the time is short, the clock drift may be disregarded. If this is not the case, the subject technology may be extended to include both clock offset and clock drift rate estimation. For example, the Karl/Willig approach proposes a drift estimation using multiple data points and assuming that sensor node drift is constant through an interval of interest. It is also envisioned that the subject technology may apply to a subset of nodes. In such an application, the central access point AP can multicast or send out synchronizing messages to selected sensors and/or nodes instead of using broadcast messages directed to all nodes within the network.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A method for synchronizing devices from a central access point node in which synchronization messages may be lost, the method comprising steps of:
   utilizing a low latency protocol from the central access point node to the devices to transmit a first series of synchronization messages, each synchronization message in the first series including a central access point node timestamp;
   transmitting a second series of synchronization messages from the devices to the central access point node in response to the first series of synchronization messages, wherein the second series is smaller than the first series due to lost messages and each synchronization message of the second series includes a corresponding device timestamp respective to each device, wherein the device timestamp derives from a clock of each device
   calculating an intermediate average clock offset for each device, the intermediate average clock offset being equal to a difference between the central point node timestamp and the device timestamp for each synchronization message of the second series;
   calculating an overall relative clock offset equal to an average of the intermediate average clock offsets for each device;
   synchronizing the clock of each device by applying the overall relative clock offset for each device;
   transmitting data acquisition commands from the central access point node to the devices using a high reliability protocol different from the low latency protocol; and
   receiving responses to the data acquisition commands at the central access point node from the devices.

2. A method as recited in claim 1, wherein the devices are wireless sensors, the low latency protocol is UDP (user datagram protocol), and the high reliability protocol is TCP (transmission control protocol).

3. A method as recited in claim 1, wherein the second series of synchronization messages includes timestamps sent to first and second devices, and further comprising a step of accounting for failure in delivery of a portion of the second series of synchronization messages by utilizing each broadcast received at the first and second device nodes.

4. A method as recited in claim 1, wherein the series of synchronization messages is sent from the central access point node to the devices in a first sequence, without any immediate responses from the devices, and where each device sends a second sequence of responses after the first sequence of messages has ended.

5. A method as recited in claim 1, wherein recorded timestamp pairs associated to the series of synchronization messages are sent separately from the devices to the central access point node using the high reliability protocol.

6. A method as recited in claim 1, wherein calculating the overall relative clock offset utilizes a subset of the series of synchronization messages, the subset being defined as broadcasts with minimal propagation and processing delays.

7. A method as recited in claim 1, further comprising a step of calculating a clock drift for at least one of the devices based on the series of synchronization messages.

8. A method as recited in claim 1, wherein the calculating of the intermediate average clock offset for each device uses only the timestamp data that is shortest.

9. A method as recited in claim 1, wherein the calculating of the intermediate average clock offset for each device uses a median approach to minimize influence of outlier data points.

10. A method as recited in claim 9, further comprising the step of accounting for failure in delivery of a portion of the series of synchronization messages by utilizing the timestamp data for every device that has timestamp data in the median approach.

11. A method as recited in claim 1, wherein the calculating of the intermediate average clock offset for each device uses a trimmed mean approach.

12. An apparatus for synchronizing devices in which synchronization messages may be lost comprising:
   a central access point node having a processor in communication with memory, the central access point node configured to:
      utilize a low latency protocol to transmit a first series of synchronization messages to the devices, each synchronization message in the first series including a central access point node timestamp;
      transmit data acquisition commands to the devices using a high reliability protocol different from the low latency protocol;
      receive a second series of synchronization messages responsive to the first series from the devices using a high reliability protocol different from the low latency protocol, wherein the second series is smaller than the first series due to lost messages and each synchronization message of the second series includes a corresponding device timestamp respective to each device, wherein the device timestamp derives from a clock of each device;
      calculate an intermediate average clock offset for each device, the intermediate average clock offset being equal to a difference between the central point node timestamp and the device timestamp for each synchronization message of the second series;
      calculate an overall relative clock offset equal to an average of the intermediate average clock offsets for each device; and
   synchronize the clock of each device by applying the overall relative clock offset for each device.

13. An apparatus as recited in claim 12, wherein the central access point node is further configured to account for failure in delivery of a portion of the series of synchronization messages prior to calculating the overall relative clock offset by utilizing every received synchronization message in the second series in the calculation of the relative clock offsets.

14. An apparatus as recited in claim 13, wherein the central access point node is further configured to receive timestamp data from the devices for use in calculating the overall relative clock offset.

15. An apparatus as recited in claim 12, wherein the central access point node is further configured to receive responses to the data acquisition commands from the devices.

* * * * *